United States Patent
Yasukawa et al.

[11] Patent Number: 5,899,589
[45] Date of Patent: May 4, 1999

[54] CAMERA

[75] Inventors: Seiichi Yasukawa, Yotsukaido; Nobuaki Sasagaki, Yokohama, both of Japan

[73] Assignee: Nikon Corporation, Tokyo, Japan

[21] Appl. No.: 08/840,733

[22] Filed: Apr. 1, 1997

[30] Foreign Application Priority Data

Apr. 1, 1996 [JP] Japan .................................. 8-078646

[51] Int. Cl.$^6$ .................................................. G03B 17/24
[52] U.S. Cl. ................................................................ 396/319
[58] Field of Search .................................... 396/310, 311, 396/315, 319, 320

[56] References Cited

U.S. PATENT DOCUMENTS

| | | | |
|---|---|---|---|
| 5,640,629 | 6/1997 | Hibino et al. | 396/319 |
| 5,649,246 | 7/1997 | Hibino et al. | 396/319 |
| 5,787,316 | 7/1998 | Shroyer | 396/319 |

FOREIGN PATENT DOCUMENTS 6-332065  12/1994  Japan .

*Primary Examiner*—Safet Metjahic
*Assistant Examiner*—Michael Dalakis

[57] ABSTRACT

A camera which can record photographic information magnetically onto film while rewinding the film. The film has perforations provided in conjunction with each frame to be exposed and near an end in a rewinding direction of the frames. A sensor is used to detect passage start time and passage end time of these perforations. A recording time determining circuit is then used to determine a recording time per unit bit so that photographic information can be recorded in an area of the film associated with each frame of the film. This recording is based on a time difference between the passage start time and the passage end time as detected by the sensor. A magnetic recorder is used to record associated photographic information in the determined recording time onto a magnetic track of the film corresponding of an exposed frame.

7 Claims, 12 Drawing Sheets

FIG. 3
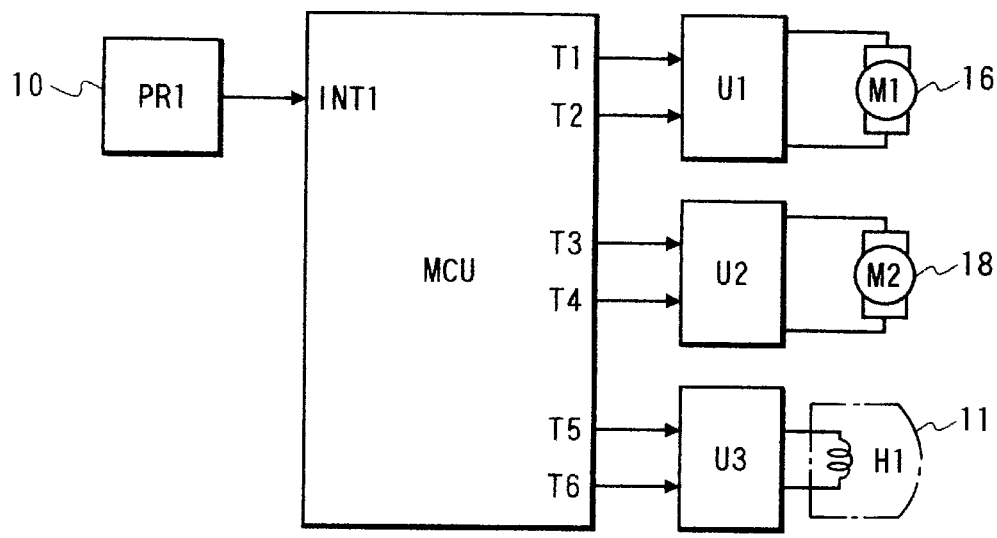
FIG. 5A
FIG. 5B
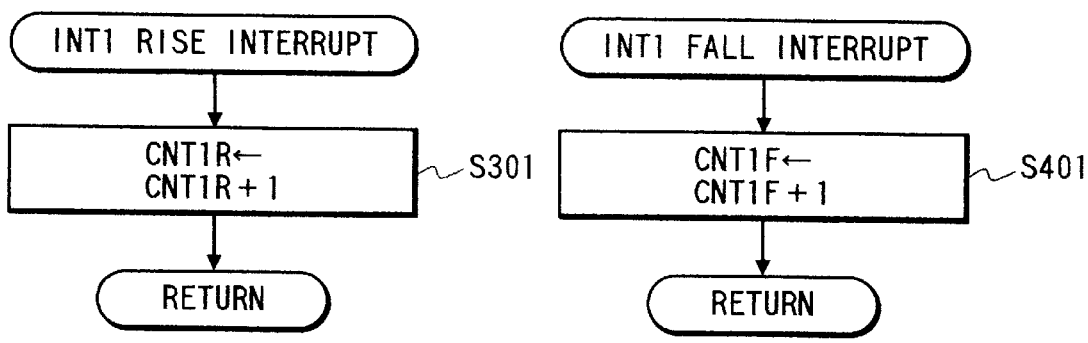

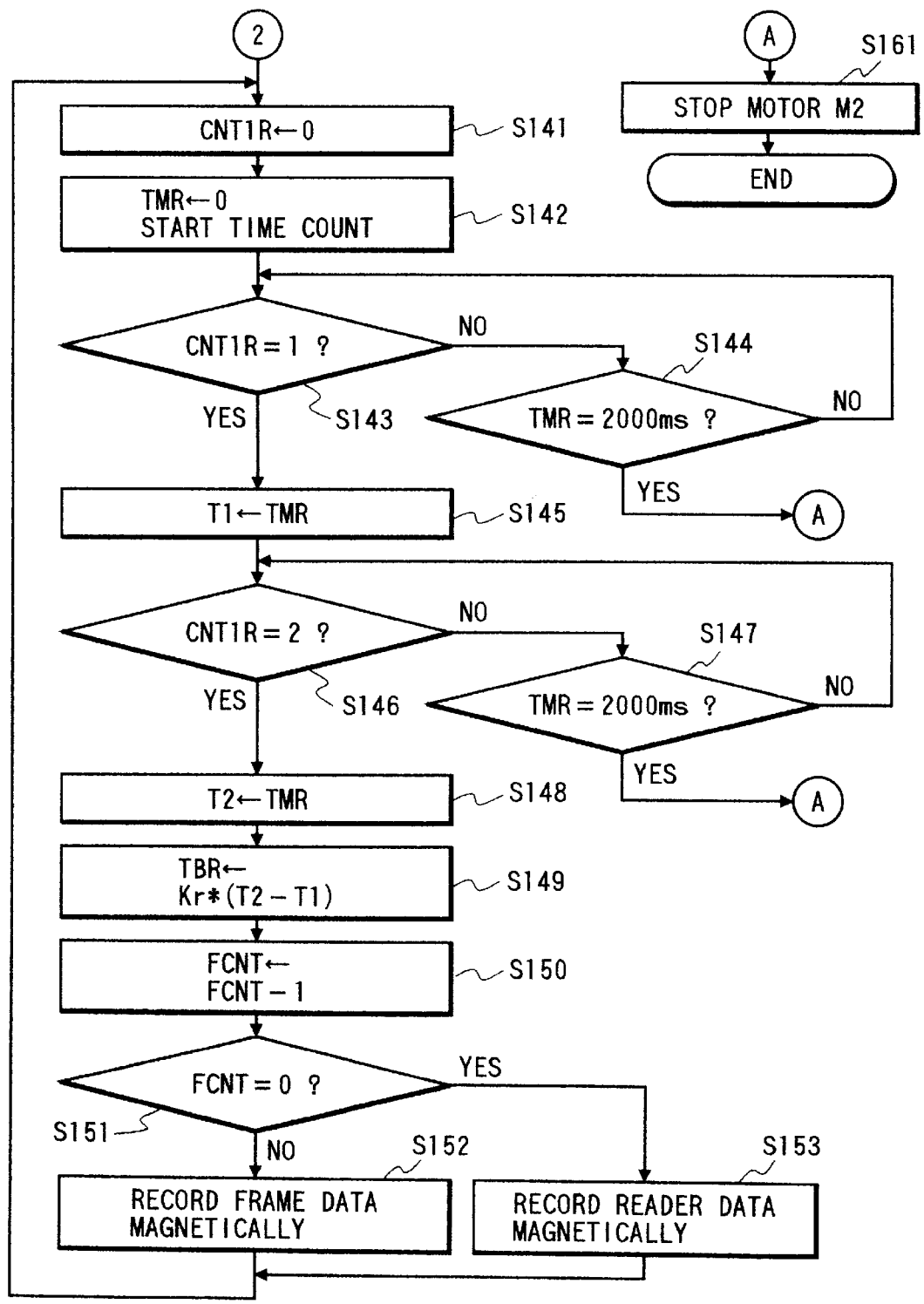

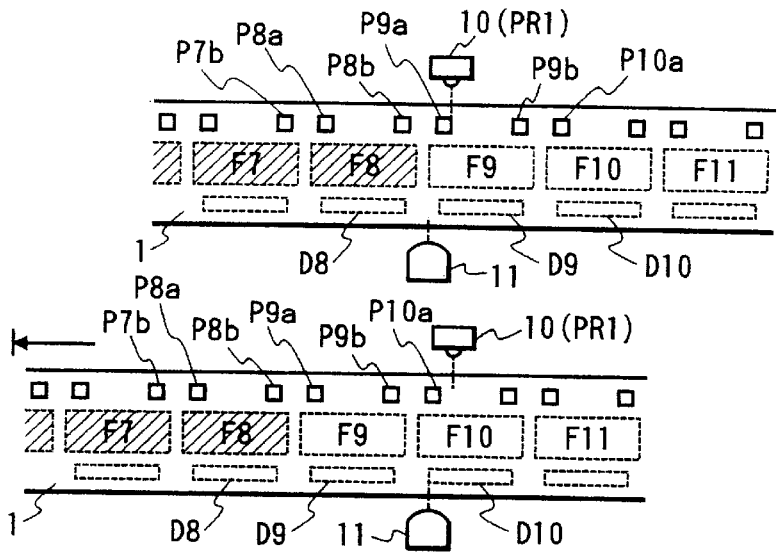
FIG. 7A
FIG. 7B
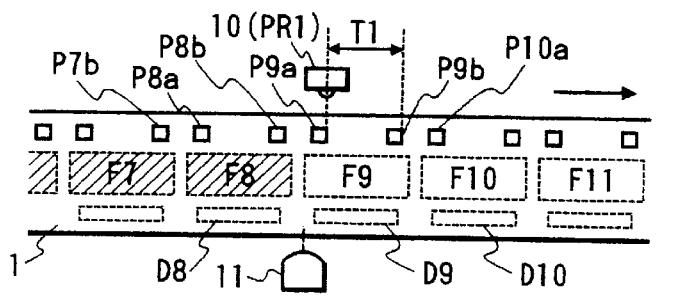
FIG. 7C
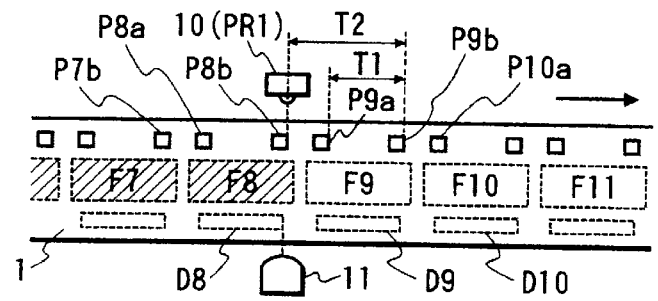
FIG. 7D
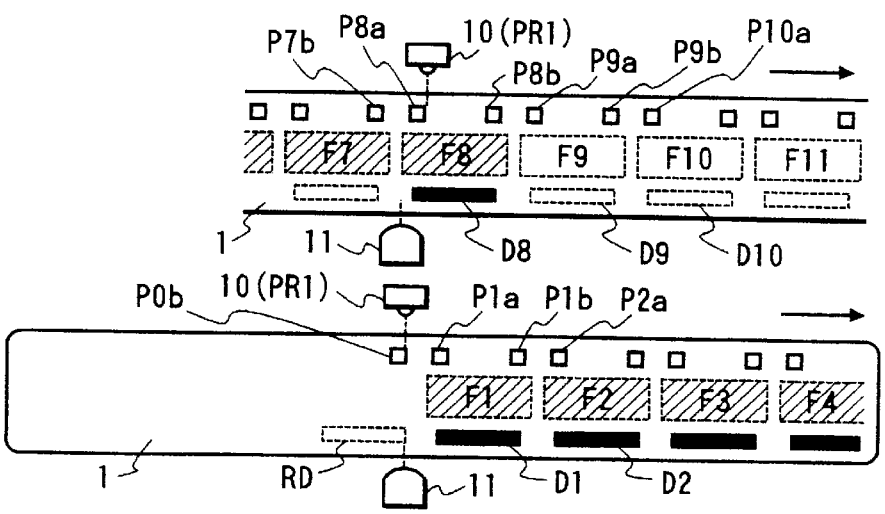
FIG. 7E
FIG. 7F

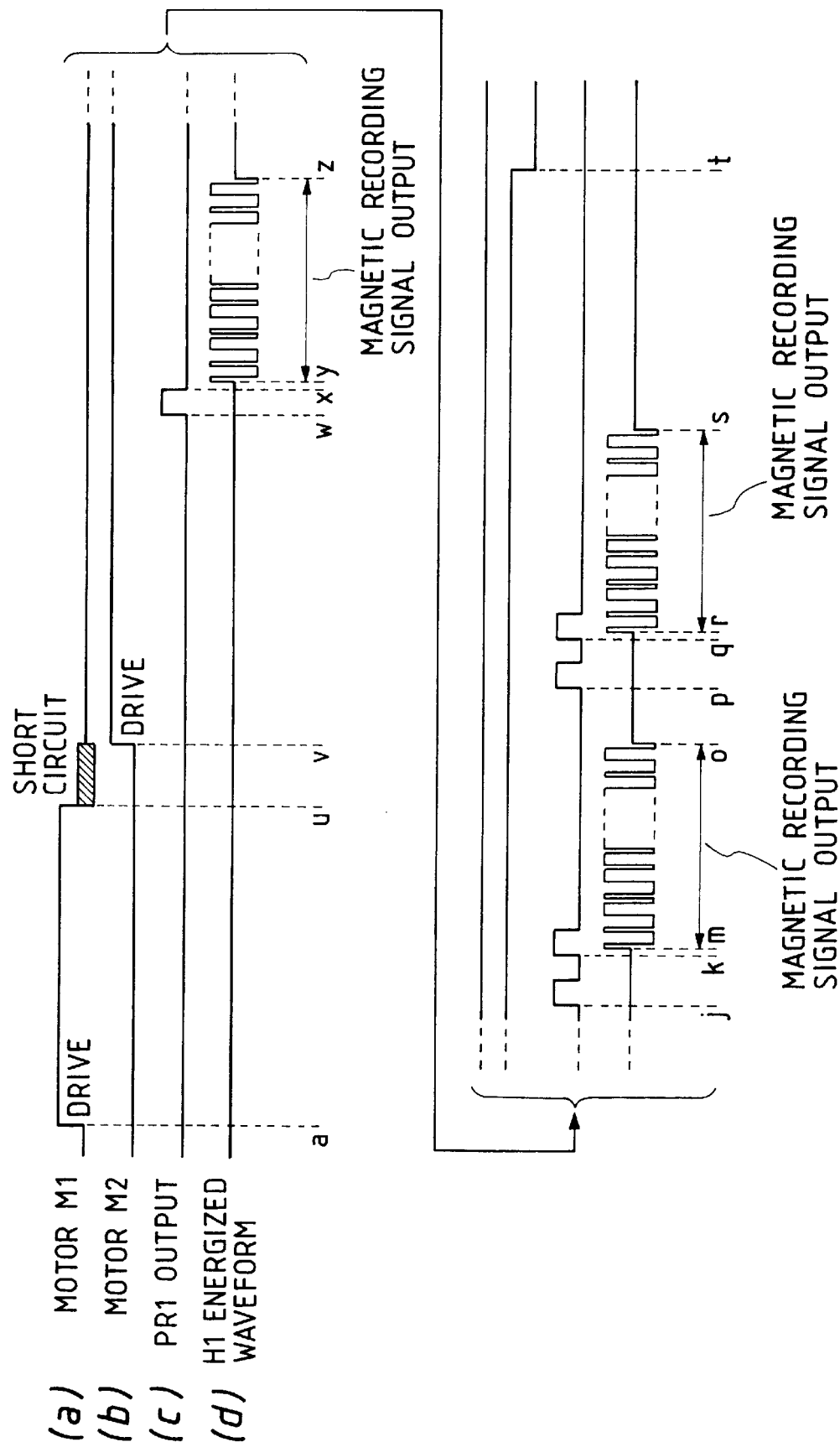

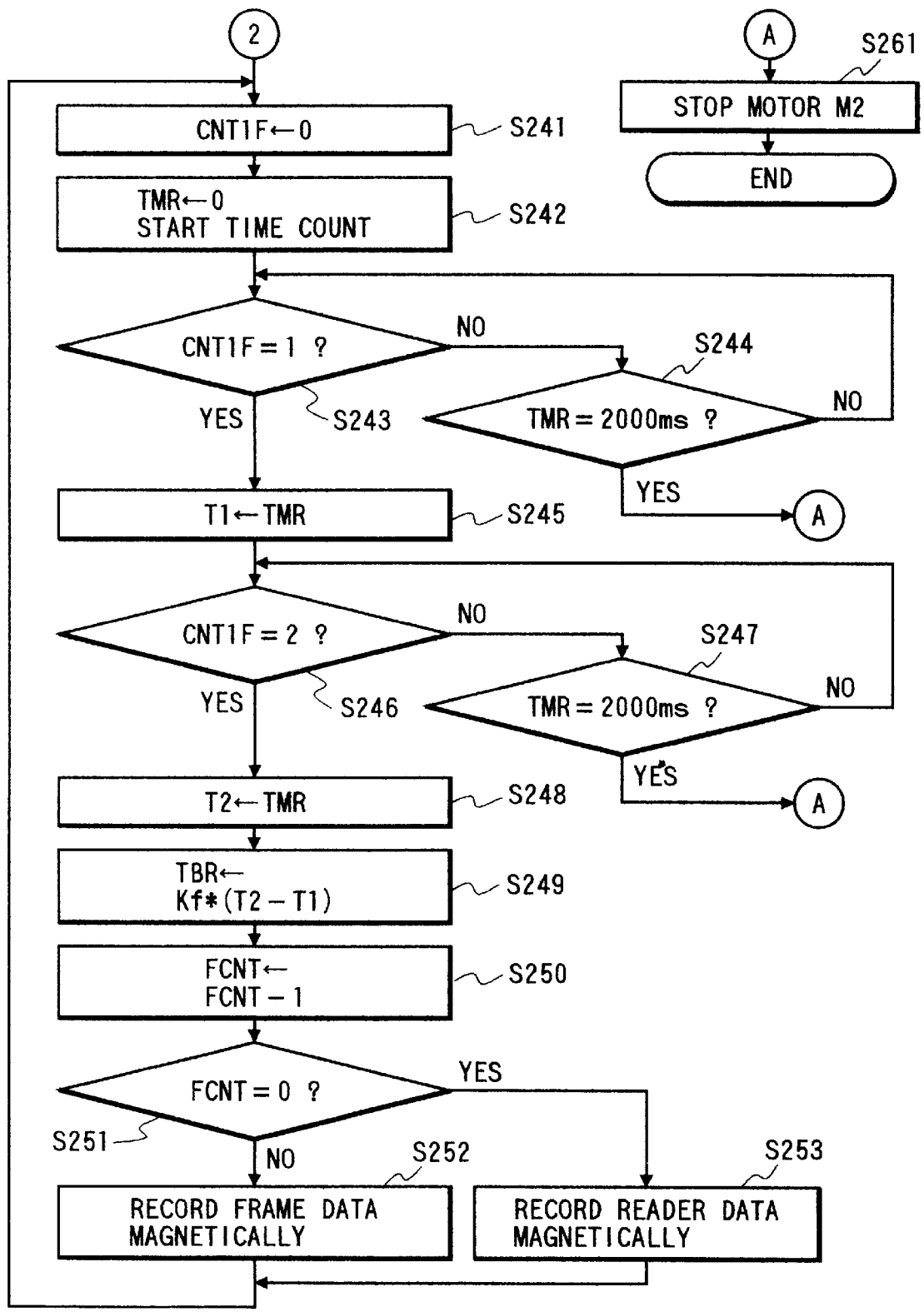

CAMERA

CROSS REFERENCE TO RELATED APPLICATIONS

The entire disclosure of Japanese Patent Application No. 8-78646 including specification, claims, drawings and summary is incorporated herein by reference in its entirety.

BACKGROUND OF THE INVENTION

1. Field of the Invention

The present invention relates to a camera provided with a magnetic recording function for recording photographic information on a magnetic track provided in correspondence to each frame of film.

2. Description of the Related Art

In recent years cameras have been developed with the capability of magnetically recording data on film. The film used in such cameras has a magnetic track at a position corresponding to each frame (each frame for photographic exposure) of the film. Photographic information is recorded in this magnetic track. This photographic information includes: calendar information of date and time; information of aperture; shutter speed; and other related information. This photographic information is information determined when a photograph of one frame of interest is taken, and the photographic information for each frame is recorded in a magnetic track corresponding to that frame.

The bulletin of Japanese Patent Application Laid Open No. 6-332065 describes a photosensor arranged to detect passage of first and second perforations provided at the winding and rewinding ends so as to be attendant on each frame of film. A time difference is measured between passage start timing of a second perforation attendant on a frame located one frame next to a recording target frame in the winding direction upon winding of film and passage start timing of a first perforation attendant on the recording target frame, detected by the photosensor. A recording frequency of photographic information onto the magnetic track corresponding to the recording target frame is then determined from the time difference thus measured.

However, in cameras arranged to perform winding by electric power, operations carried out in connection with photography include performing the operation of exposure on a frame by shutter and then winding the film by that one frame at a time. In addition, the electric motor rewinds the entire film after completion of photography to store the film in a cartridge. In such electrically powered cameras, an effective way of recording the photographic information in the magnetic tracks is a method for recording information at the time of rewinding the entire film into the cartridge after completion of photography (batch recording method). Specifically, the photographic information for the all frames determined upon exposure is stored once, and when rewinding is carried out later on, the magnetic head is urged against the film surface to record the photographic information en bloc in the magnetic tracks of respective frames passing in succession.

However, with the batch recording method for recording the photographic information for the all frames upon rewinding of the film, when the method described in the above-stated bulletin of Japanese Patent Application Laid-Open No. 6-332065 is applied, the recording frequency of photographic information onto the magnetic track for the final frame cannot be determined. Specifically, in winding the final frame and thereafter rewinding it, the final frame is the recording target frame and there exists no frame located one frame next to this recording target frame when the film is moved in the winding direction. Therefore, the time difference cannot be measured between passage start timings of two perforations, so that a recording time per unit bit of photographic information onto the magnetic track for the final frame cannot be determined.

SUMMARY OF THE INVENTION

The present invention is designed to solve the above problem and an object of the present invention is to provide a camera that can determine the recording time per unit bit of photographic information onto the magnetic track for the final frame in the case of application of the batch recording method for recording data of the all frames upon rewinding the film.

In order to achieve the above object, a camera employing the above-stated batch recording method comprises a sensor for detecting passage of first and second perforations provided at ends in winding and rewinding directions of each frame of film so as to be attendant thereon. A recording time determining circuit is used to measure a time difference between passage start timing and passage end timing of a second perforation attendant on one frame upon rewinding of film. The timings are detected by this sensor, and for determining a recording time per unit bit of photographic information onto a magnetic track provided at a position corresponding to the one frame from the time difference thus measured. According to this embodiment, the recording time per unit bit (bit rate) of photographic information onto the magnetic track corresponding to the final frame is determined from the time difference between passage start timing and passage end timing of the second perforation attendant on the final frame.

Further objects and benefits are achieved by a camera employing the above-stated batch recording method comprising a sensor for detecting passage of first and second perforations provided at ends in winding and rewinding directions of each frame of film so as to be attendant thereon. A first recording time determining circuit is used to measure a time difference between passage start timing and passage end timing of a second perforation attendant on a final frame upon rewinding of film, the timings being detected by this sensor, and for determining a recording time per unit bit of photographic information onto a magnetic track provided at a position corresponding to the final frame from the time difference thus measured. A second recording time determining circuit for measuring a time difference between passage start time of a first perforation attendant on a frame located one frame next to a recording target frame in the rewinding direction upon rewinding of film and passage start timing of a second perforation attendant on the recording target frame, the timings being detected by the sensor, and for determining a recording time per unit bit of photographic information onto a magnetic track provided at a position corresponding to the recording target frame.

According to this embodiment of the present invention, the recording time per unit bit of photographic information onto the magnetic track corresponding to the final frame (the first bit rate) is determined from the time difference (first measured time difference) between the passage start timing and passage end timing of the second perforation attendant on the final frame. For frames other than the final frame, the recording time per unit bit of photographic information onto the magnetic track corresponding to the recording target frame (the second bit rate) is determined from the time difference (second measured time difference) between the passage start timing of the first perforation attendant on the frame located one frame next to the recording target frame in the rewinding direction and the passage start timing of the second perforation attendant on the recording target frame. In this case, since the recording time per unit bit onto the magnetic track corresponding to the recording target frame is determined at the passage start timing of the second perforation of the recording target frame (non-final frame) and magnetic recording is started based thereon, the magnetic recording can be performed using the full recordable region of magnetic track of each recording target frame.

In the above embodiment, the first recording time determining circuit is arranged to determine the recording time per unit bit by multiplying the measured time difference by a first coefficient. The second recording time determining circuit is arranged to determine the recording time per unit bit by multiplying the measured time difference by a second coefficient.

According to this configuration, when the first coefficient in determining the first bit rate is different from the second coefficient in determining the second bit rate, the respective recording times can be optimized. Specifically, since a space length of a gap between perforation edges measured for determining the recording time per unit time of photographic information onto the magnetic track corresponding to the final frame is different from a space length of a gap between perforation edges measured for determining the recording time per unit bit of photographic information onto a magnetic track corresponding to a non-final frame. The first recording time and second recording time each can be optimized by making the first coefficient and second coefficient different from each other.

In the above embodiment, the first coefficient and second coefficient is set as such values that the first bit rate becomes smaller than the second bit rate. According to this configuration, the recording time per unit bit of photographic information onto the magnetic track corresponding to the final frame is shorter than the recording time per unit bit of photographic information onto a magnetic track corresponding to a non-final frame, whereby actual recording data can be stored within the limited region of magnetic track for the all frames. Specifically, for the final frame, the recording time per unit bit is determined at the passage end timing of the second perforation and the magnetic recording is started based thereon. For the non-final frames, the recording time per unit bit is determined at the passage start timing of the second perforation and the magnetic recording is started based thereon. In this case, the magnetic recording start timing of the final frame becomes later than the magnetic recording start timing of non-final frame, so that a magnetically recordable length on film for the final frame becomes shorter. Therefore, the recording time per unit bit of photographic information onto the magnetic track corresponding to the final frame is shortened to the extent to compensate for it, whereby the actual recording data can be stored in the limited range of magnetic track for all frames.

A camera employing the above-stated batch recording method is arranged to comprise a sensor for detecting passage of first and second perforations provided at ends in winding and rewinding directions of each frame of film so as to be attendant thereon. A first recording time determining circuit is used to measure a time difference between passage start timing and passage end timing of a second perforation attendant on a final frame upon rewinding of film. The timings being detected by this sensor, and for determining a recording time per unit bit of photographic information onto a magnetic track provided at a position corresponding to the final frame from the time difference thus measured. A second recording time determining circuit is used to measure a time difference between passage end timing of a first perforation attendant on a frame located one frame next to a recording target frame in the rewinding direction upon rewinding of film and passage end timing of a second perforation attendant on the recording target frame, the timings being measured by the sensor, and for determining a recording time per unit bit of photographic information onto the magnetic track provided at a position corresponding to the recording target frame from the time difference thus measured.

According to this embodiment of the present invention, the recording time per unit bit of photographic information onto the magnetic track corresponding to the final frame (the first bit rate) is determined from the time difference (first measured time difference) between the passage start timing and passage end timing of the second perforation attendant on the final frame. For frames other than the final frame, the recording time per unit bit of photographic information onto the magnetic track corresponding to the recording target frame (the second bit rate) is determined from the time difference (second measured time difference) between the passage end timing of the first perforation attendant on the frame located one frame next to the recording target frame in the rewinding direction and the passage end timing of the second perforation attendant on the recording target frame. In this case, the first bit rate is determined at the passage end timing of the second perforation of the final frame and magnetic recording is started based thereon. Further, the second bit rate is determined at the passage end timing of the second perforation of the recording target frame (non-final frame) and magnetic recording is started based thereon. Namely, the bit rate is determined at the passage end timing of the second perforation for either one of the final frame and the non-final frames and the magnetic recording is started based thereon, so that start positions of magnetic recording can be unified for the all frames.

In the above embodiment, the camera is arranged so that the first bit rate is determined by multiplying the first measured time difference by a first coefficient and the second bit rate is determined by multiplying the second measured time difference by a second coefficient. According to this configuration, when the first coefficient in determining the first bit rate is different from the second coefficient in determining the second bit rate, the respective bit rates can be optimized. Specifically, since the space length of the gap between perforation edges measured for determining the recording time per unit bit of photographic information onto the magnetic track corresponding to the final frame is different from the space length of the gap between perforation edges measured for determining the recording time per unit bit of photographic information onto the magnetic track corresponding to a non-final frame, the first bit rate and second bit rate each can be optimized by making the first coefficient and second coefficient different from each other.

In the above embodiment, the first coefficient and second coefficient may be set as such values that the first bit rate and second bit rate become equal to each other. According to this configuration, the recording time per unit bit of photographic information onto the magnetic track corresponding to the final frame is equal to the recording time per unit bit of photographic information onto the magnetic track corresponding to the non-final frame, whereby the actual recording data can be stored within the limited region of magnetic track for the all frames. Specifically, for the final frame, the first bit rate is determined at the passage end timing of the second perforation and magnetic recording is started based thereon. For the non-final frames, the second bit rate is determined at the passage end timing of the second perforation and magnetic recording is started based thereon. In this case, the magnetic recording start time of the final frame becomes equal to the magnetic recording start time of non-final frame, so that magnetically recordable lengths on the film become equal to each other for the all frames. Therefore, when the recording time per unit bit of photographic information onto the magnetic track corresponding to the final frame is set to be equal to the recording time per unit bit of photographic information onto the magnetic track corresponding to the non-final frame, the actual recording data can be stored within the limited region of magnetic track for the all frames.

In the above embodiment, the first coefficient and second coefficient may be set as such values that the first bit rate becomes smaller than the second bit rate. According to this configuration, the recording time per unit bit of photographic information onto the magnetic track corresponding to the final frame becomes shorter than the recording time per unit bit of photographic information onto the magnetic track corresponding to the non-final frame, whereby the actual magnetic recording length in the final frame can be prevented from exceeding the permissible length of magnetic track. Namely, the space length of the gap between the perforation edges measured for determining the recording time per unit bit of photographic information onto the magnetic track corresponding to the final frame is shorter than the space length of the gap between the perforation edges measured for determining the recording time per unit bit of photographic information onto the magnetic track corresponding to the non-final frame, and the measurement accuracy is considered to be degraded thereby. Therefore, when the recording time per unit bit for the final frame is set a little shorter, the actual magnetic recording length thereof can be prevented from exceeding the permissible length of magnetic track.

BRIEF DESCRIPTION OF THE DRAWINGS

FIG. 3 is a block diagram to show an electric circuit setup of this camera according to the present invention;

FIGS. 4A, 4B, 4C and 4D are flowcharts (Embodiment 1) showing the characteristic process operation carried out by a microcomputer MCU of this camera according to the present invention;

FIGS. 5A and 5B are flowcharts of interrupt process handling by the microcomputer MCU of the present invention;

FIGS. 7A, 7B, 7C, 7D, 7E and 7F are schematic drawings showing feed states of film (in rewinding of film from midway) controlled by the microcomputer MCU of the present invention;

FIG. 8 is a timing chart of sections controlled in the characteristic process operation (the operation in rewinding the film from the final end) handled by the microcomputer MCU of the present invention;

FIGS. 10A, 10B, 10C and 10D are flowcharts (Embodiment 2) showing the characteristic process operation carried out by the microcomputer MCU of the camera according to the present invention.

DESCRIPTION OF THE PREFERRED EMBODIMENTS

Figure 1:
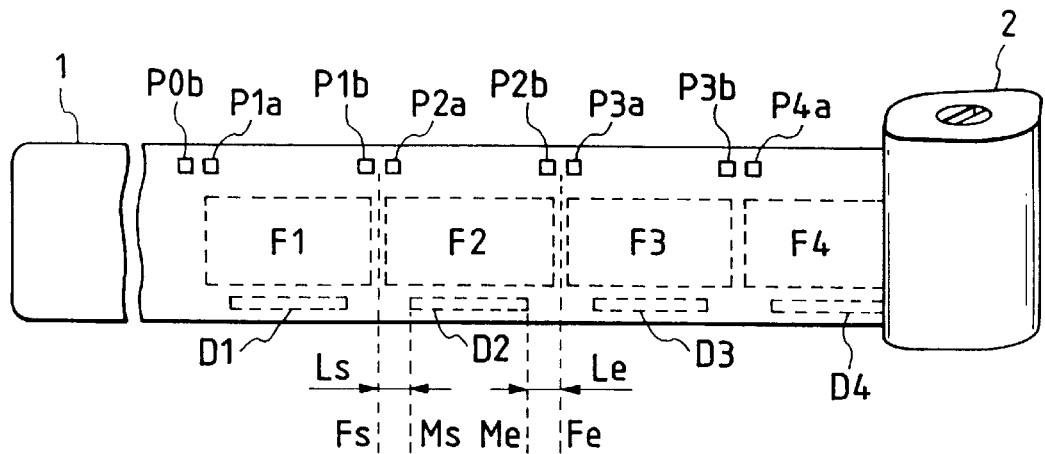
FIG. 1 is a drawing to show the configuration of film used in the camera according to the present invention.

The present invention will be described in detail based on the embodiments thereof. FIG. 1 is a drawing to show the configuration of film used in the camera according to the present invention, which shows a state in which part of film 1 rolled in cartridge 2 is drawn out. The film 1 is provided with two perforations P per frame F intended to experience one exposure. Specifically, each frame F is provided with perforations Pa and Pb at the ends in the winding direction and in the rewinding direction thereof. For example, frame F1 is provided with perforations P1a and P1b, frame F2 is provided with perforations P2a and P2b, and so on.

This film I has magnetic tracks D and a permissible range of magnetic recording is determined for recording the photographic information for each frame F. For example, the magnetic track D1 is set for frame F1, and the magnetic track D2 for frame F2. Both ends Ms, Me of each magnetic track D are restricted to inside positions shifted by respective lengths Ls and Le from the boundary positions Fs, Fe of each frame F.

Figure 2:
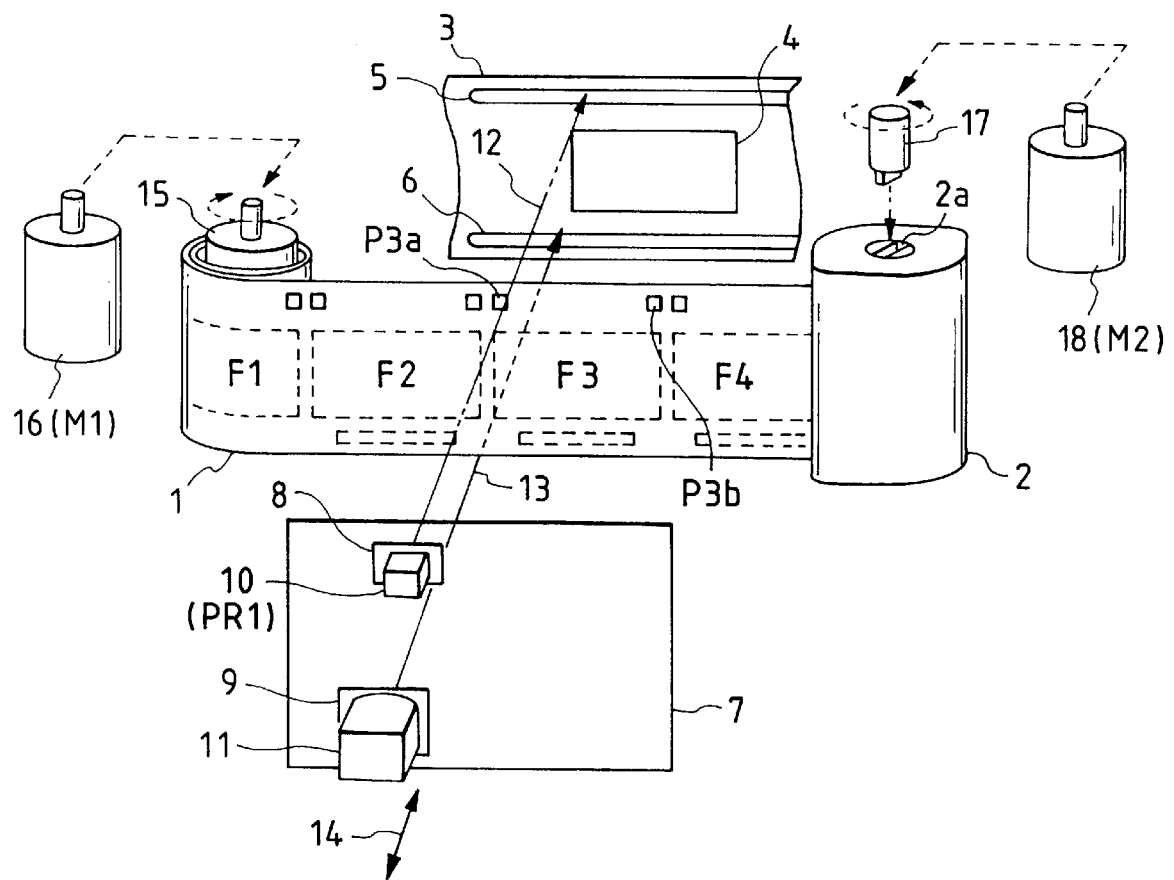
FIG. 2 is a drawing to schematically show a part of the mechanism of camera using the film and cartridge shown in FIG. 1.

FIG. 2 schematically shows a part of the mechanism of camera using the film 1 and cartridge 2. In FIG. 2, the cartridge 2, film 1, and perforations P3a, P3b are the same as those in FIG. 1. An aperture section 3 of the camera is composed of an aperture 4 for exposing an image of subject in each frame F of film 1, and upper rail 5 and lower rail 6 for regulating the position of film 1 in the directions along the optical axis. A press plate 7 of the camera is provided with aperture sections 8 and 9.

A photoreflector 10 is arranged to be opposed directly to the film 1 through the aperture section 8 while a magnetic head 11 (recording-reproduction integral-type head) is arranged to be opposed directly to the film 1 through the aperture section 9. In the drawing the aperture section 3, film 1, and press plate 7 are illustrated in a separate state, but they are placed actually in the positional close relationship contact with little gap. The photoreflector 10 is positioned so as to detect the reflectivity at the position of the height of perforation P of film 1 and thus at the position of the height of the upper rail 5, as shown by the chain line 12 on the drawing. This photoreflector 10 outputs a digital signal "H" when it is opposed to the surface of the upper rail with higher reflectivity at an opening portion of perforation P of film 1. The photoreflector 10 outputs a digital signal "L" when it is opposed to the film surface, thereby detecting a position of an opening edge of perforation P. The magnetic head 11 is located at a position opposed to the magnetic track D, as shown by the chain line 13. The magnetic head 11 translationally moves back and forth in the directions indicated by arrows 14, so that it can take the position in contact with the film 1 and the position away from the film 1.

A spool (winding spool) 15 for winding the film 1 moves the film 1 in the winding direction when rotating clockwise on the top plan view thereof. A motor (winding motor) 16 (M1) gives driving force to rotate the spool 15 and they are connected by a driving force transmission system not illustrated. A groove 2a is cut in a shaft of cartridge 2 and a fork (rewinding fork) 17 is fit in the groove 2a. When this fork 17 rotates counterclockwise on the top plan view, the film 1 is wound up into the cartridge 2 as moving in the rewinding direction. Inversely, when the fork 17 rotates clockwise on the top plan view, the film 1 is pushed out in the winding direction from the cartridge 2. A motor (rewinding motor) 18 (M2) gives driving force to the fork 17 and they are coupled by a driving force transmission system not illustrated.

FIG. 3 is a block diagram showing the electric circuit setup of this camera. MCU stands for a microcomputer. The photoreflector 10 (PR1) transmits one output to an interrupt port INT1 of the microcomputer MCU. U1 represents a motor driver circuit for driving the motor 16 (M1), which controls the motor 16 (M1) in three states of normal rotation, short circuit, and open circuit by two signals of output ports T1, T2 of the microcomputer MCU.

U2 is a motor driver circuit for driving the motor 18 (M2), which controls the motor 18 (M2) in four states of normal rotation, reverse rotation, short circuit, and open circuit by two signals of output ports T3 and T4 of the microcomputer MCU. U3 is a driving circuit for controlling the electric current supplied to a recording coil (magnetic recording head coil) H1 incorporated in the magnetic head 11 in three states of normal direction, reverse direction, and zero, which is controlled by output ports T5 and T6 of the microcomputer MCU.

FIRST PREFERRED EMBODIMENT

Operation Upon Rewinding of Film from Midway

Next, in this camera, the operation upon rewinding of film 1 from midway will be described referring to the flowcharts of FIGS. 4A to 4D and FIGS. 5A and 5B, the timing chart of FIG. 6, and the schematic drawings of feed states of FIGS. 7A to 7F. The schematic drawings of feed states of FIGS. 7A to 7F schematically show the relative positional relation among the portions of film 1, photoreflector 10 (PR1), and magnetic head 11 at respective times.

In this embodiment, an example will be described as to the operation wherein photography has been carried out up to the eighth frame F8 and then the ninth frame F9 is located at the photographic exposure position (photography-ready position) and wherein from that state (FIG. 7A) the film 1 starts being rewound.

In this state, photography is finished for the eighth frame F8 and automatic winding of one frame is completed, so that the ninth frame F9 is located at the photographic exposure position. In this state, the photoreflector 10 (PR1) is positioned just near the right edge (opening edge) of perforation P9a. The magnetic head 11 is located between the perforation P8b and the perforation P9a with respect to the horizontal directions.

When instructed to start the film rewinding process from this state, the microcomputer MCU first clears variable CNT1F to 0 (step S101 shown in FIG. 4A), starts driving the motor 16 (M1) (step S102), and, at the same time, resets the value of timer TMR to 0 and starts counting the time (step S103). This point in time corresponds to point "a" in the timing chart shown in FIG. 6. The drive of motor 16 (M1) starts moving the film 1 to the left in the drawing (in the winding direction) from the position in state A of FIG. 7A.

The microcomputer MCU waits by OR logic either until the value of variable CNT1F becomes 2 (step S104) or until the timer TMR reaches the value corresponding to 300 ms (step S105). The value of variable CNT1F is updated in the interrupt process of FIG. 5B. FIG. 5B is a flowchart of the interrupt process handled when a fall of interrupt port INT1 is detected, wherein CNT1F, being a memory variable of the input number of fall edge, is counted one up at step S401 and then the flow returns.

Either when the value of variable CNT1F becomes 2 at step S104 or when the timer TMR reaches the value corresponding to 300 ms at step S105, i.e., when the time after drive of motor 16 (M1) reaches 300 ms, the microcomputer proceeds to step S106. The motion of film 1 herein is such that perforations P9b and P10a soon pass the position of photoreflector 10 (PR1), whereby the output signal from the photoreflector 10 (PR1) shows two rises and two falls (point b in FIG. 6).

When the output of photoreflector 10 (PR1), i.e., the input to the INT1 terminal of microcomputer MCU changes, the microcomputer MCU counts one up in the content of variable CNT1R for every rise of INT1 terminal by the INT1 rise interrupt routine shown in FIG. 5A (step S301), or counts one up in the content of variable CNT1F for every fall of INT1 terminal by the INT1 fall interrupt routine shown in FIG. 5B (step S401).

Thus, since variable CNT1F is 2 at this point, a YES determination at step S104 results, and the microcomputer goes to step S106. At step S106 the microcomputer MCU short-circuits the motor 16 (M1) (point c in FIG. 6). Then the microcomputer MCU clears the content of timer TMR to 0 and starts counting time by this timer TMR (step S107), waits before the timer TMR reaches the value corresponding to 50 ms (step S108), and stops the motor 16 (M1) when the time has elapsed (step S109: point d in FIG. 6).

At this point the camera is in the state B of FIG. 7B, wherein the film 1 is stopped in such positional relation of the opening portion of perforation P10a of the tenth frame FIO has passed the photoreflector 10 (PR1) a little. The process operation up to this point is a process for assuring an "approach zone" of fixed amount for stabilizing the speed of magnetic recording signal to film in coming movement of film 1 in the rewinding direction, which is the drive direction opposite to rewinding.

Figure 6:
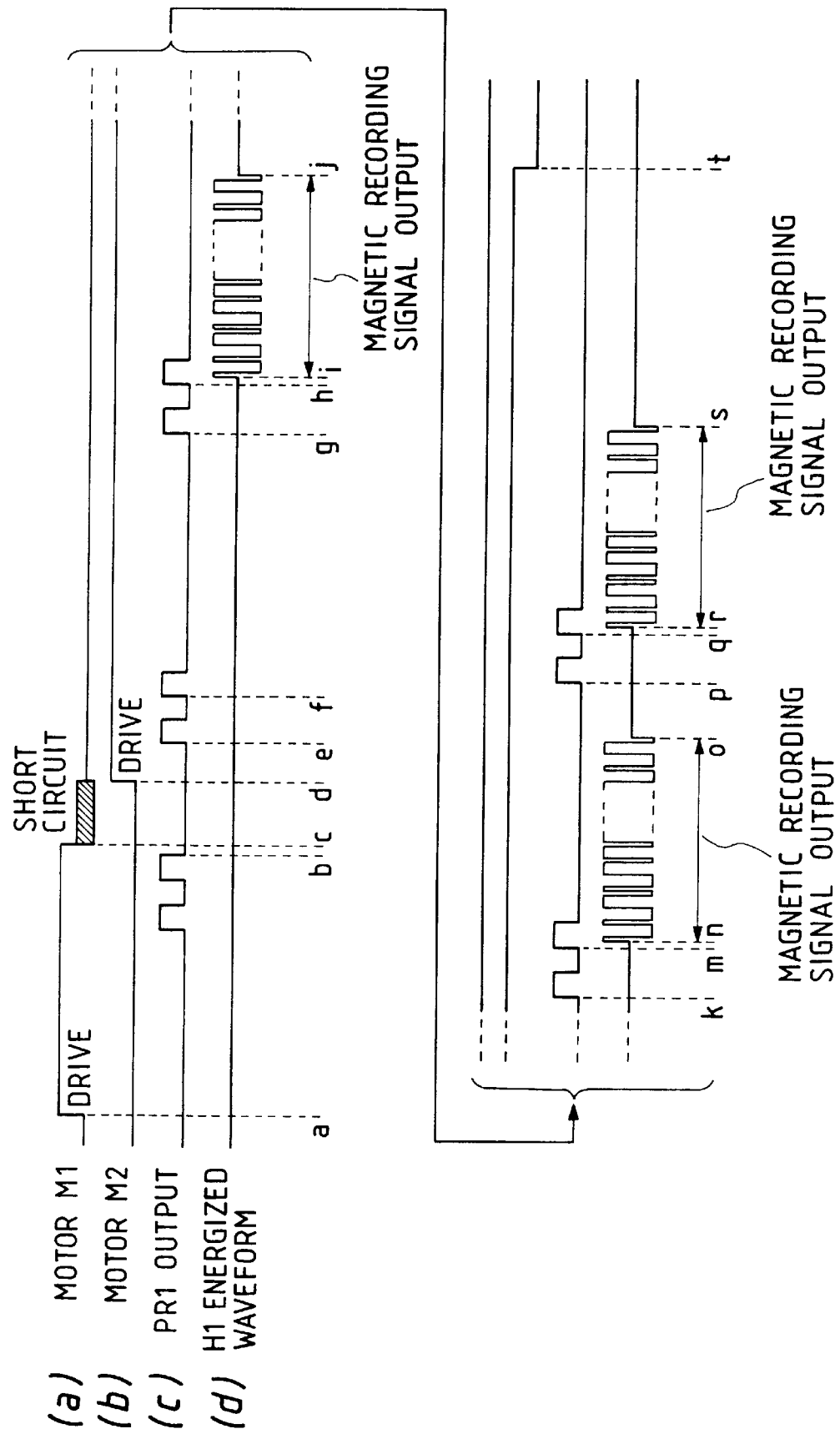
FIG. 6 is a timing chart of sections controlled in the characteristic process operation (the operation in rewinding the film from midway) handled by the microcomputer MCU of the present invention.
Figure 9A:
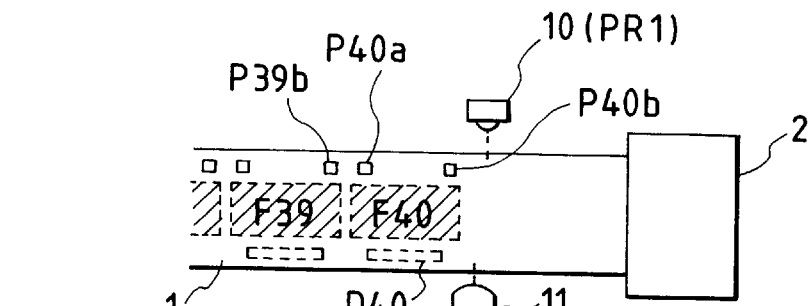
FIGS. 9A, 9B, 9C, 9D, 9E and 9F are schematic drawings showing feed states of film (in rewinding of film from the final end) controlled by the microcomputer MCU of the present invention.
Figure 9B:
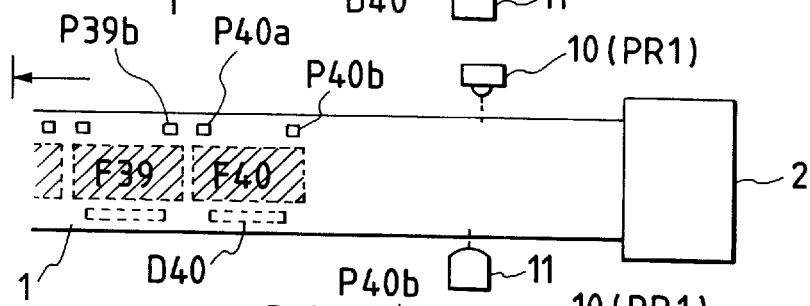
Figure 9C:
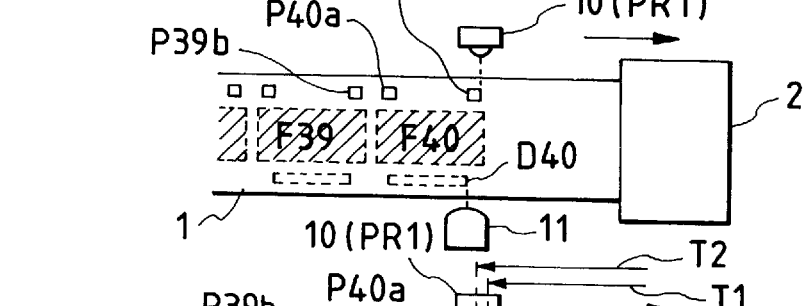
Figure 9D:
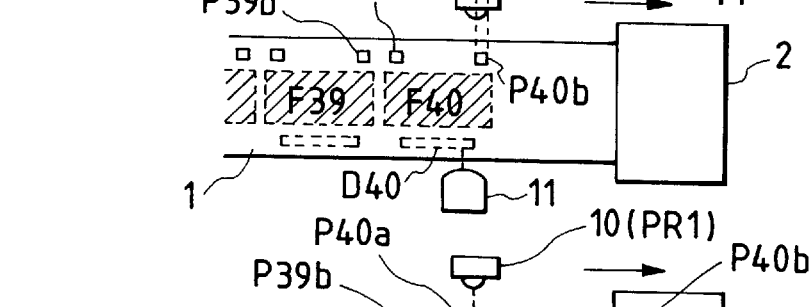
Figure 9E:
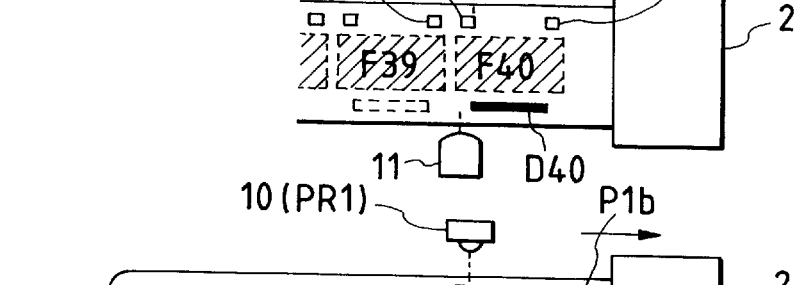
Figure 9F:
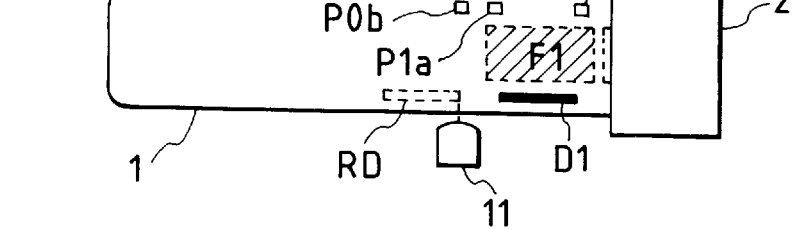
Figure 10A:
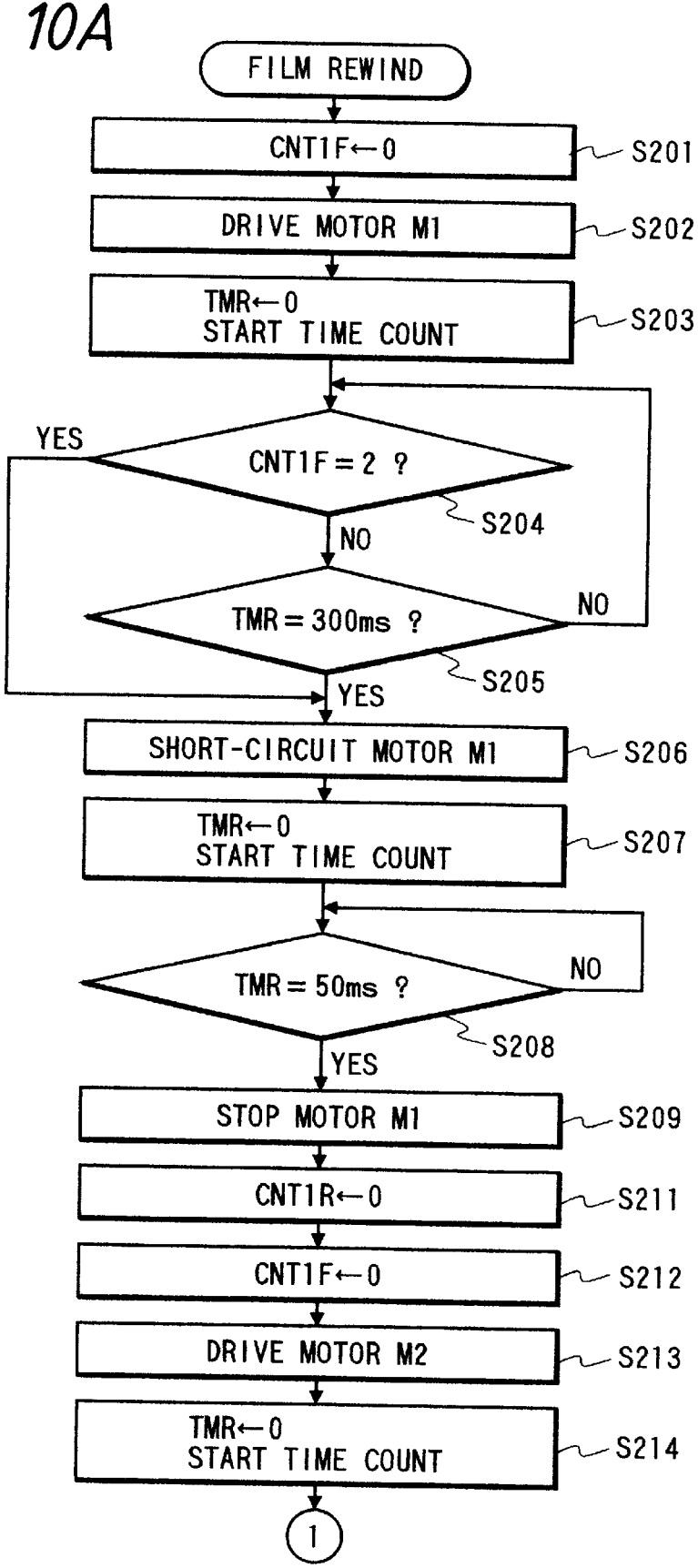
Figure 10B:
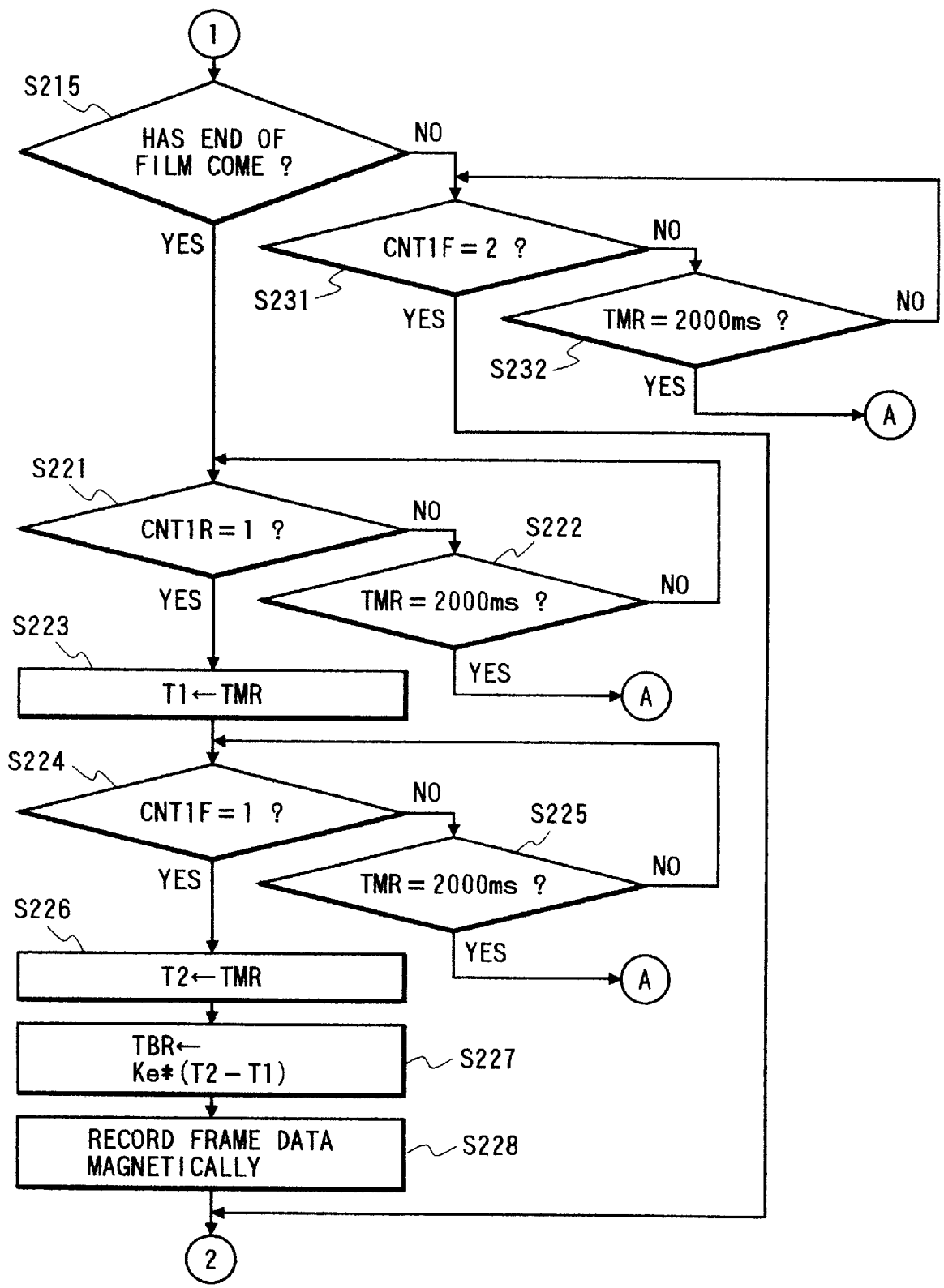

Then the microcomputer MCU clears the both variables CNT1R and CNT1F to 0 (steps S11, S112) and starts drive of motor 18 (M2) (step S113: point d in FIG. 6). This starts moving the film 1 to the right in the drawing (in the rewinding direction) from the position in the state B of FIG. 7B. Further, the microcomputer MCU clears the value of timer TMR to 0 and starts counting time by this timer TMR at the same time as the drive start of motor 18 (M2) (step S114).

Figure 4A:
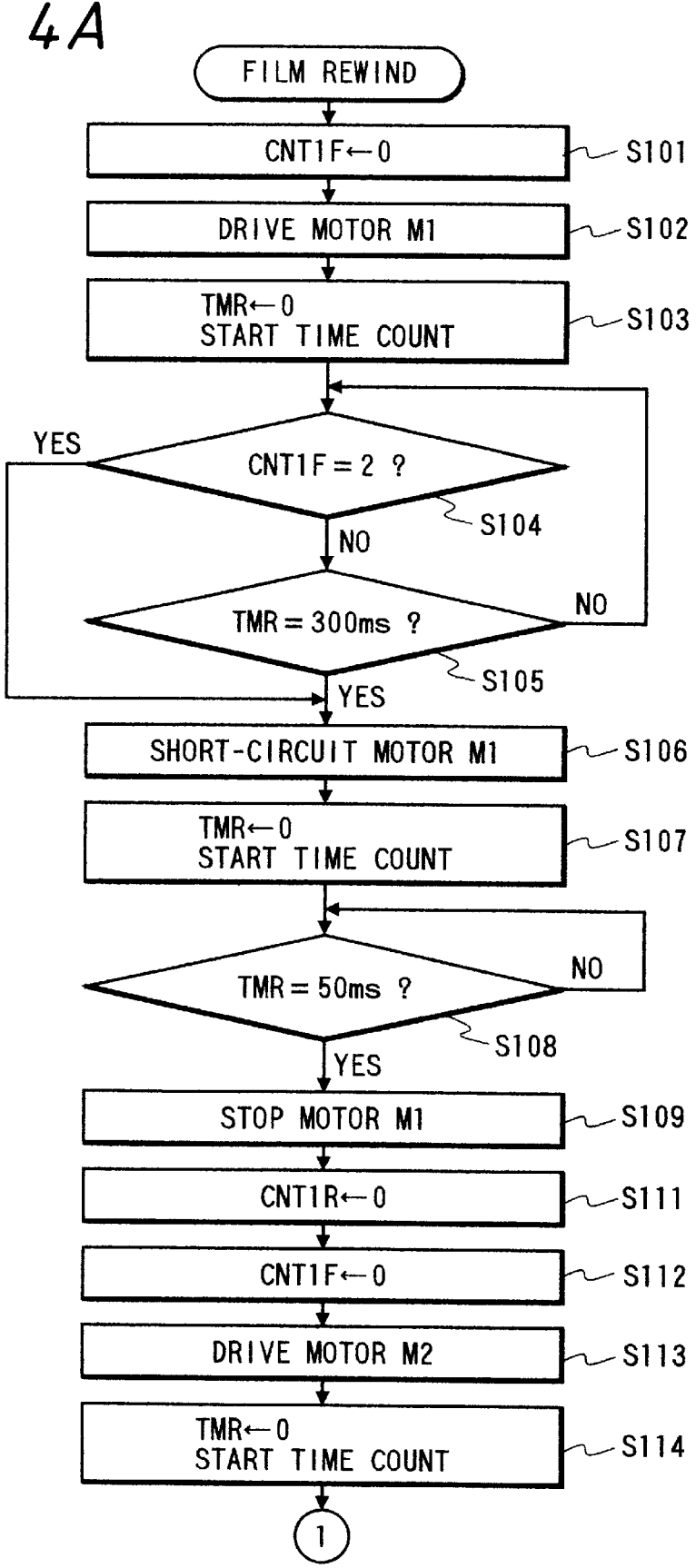
Figure 4B:
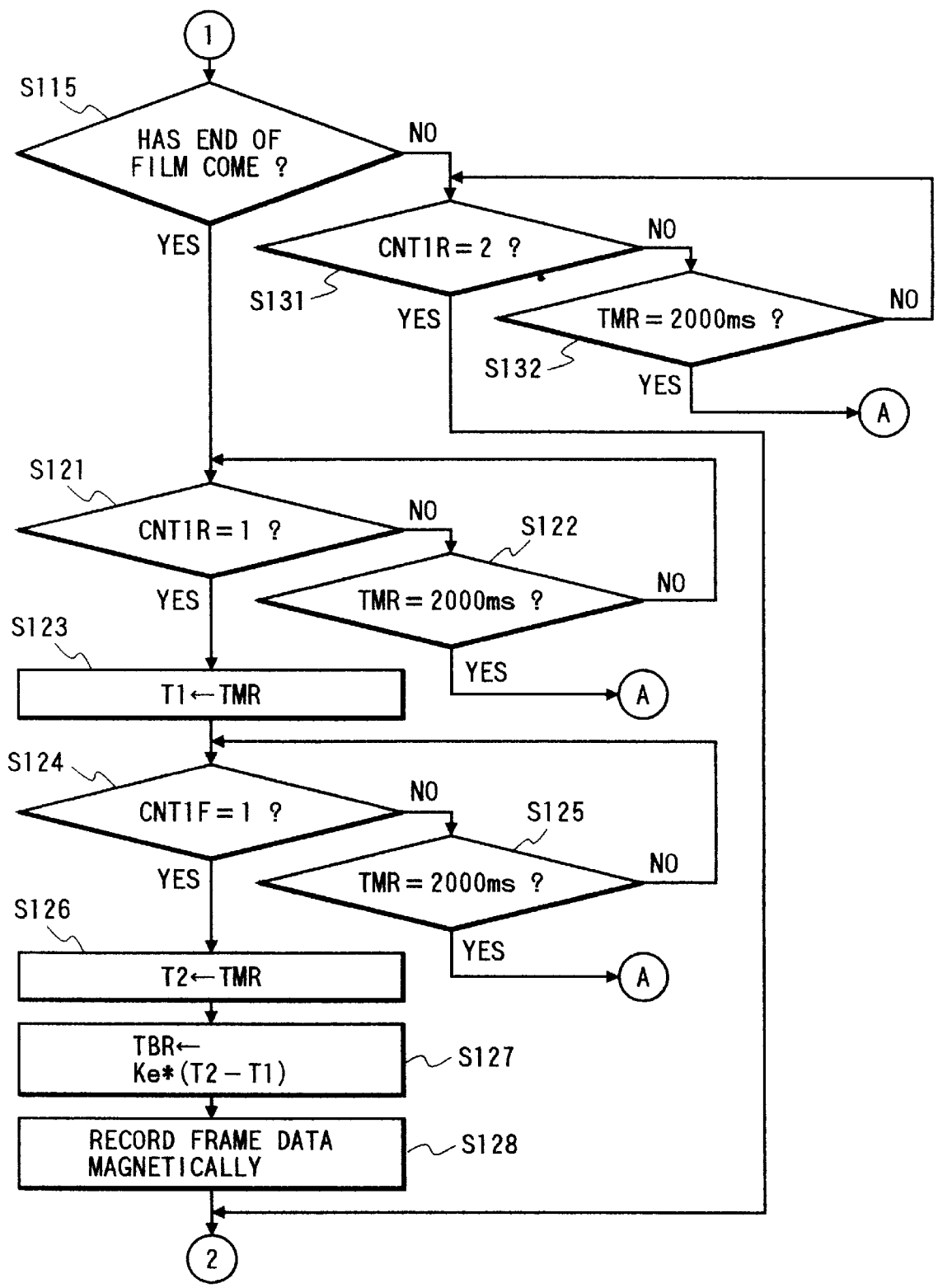

Next, the microcomputer MCU determines whether the film 1 has been wound up to the final position (step S115 in FIG. 4B). Since in this example the final position of film has not come, the microcomputer proceeds to step S131. The microcomputer MCU waits by OR logic either until the value of variable CNT1R reaches 2 (step S131) or until the timer TMR reaches the value corresponding to 2000 ms (step S132). If the value of variable CNT1R first reaches 2, the microcomputer will proceed to step S141. If TMR=2000 ms is first achieved, the microcomputer will go to step S161 of FIG. 4D.

Achievement of TMR=2000 ms of step S132 indicates that time-out occurred without input of an edge of perforation P, which appears at this stage only when some anomaly occurred. Accordingly, in the normal operation, a rise edge appears when each opening start edge of perforation P10a and P9b passes the position of photoreflector 10 (PR1) from the state B of FIG. 7B, so that variable CNT1R=2 is achieved when the opening start edge of perforation P9b passes the position (point f in FIG. 6). This confirmation of two perforations P10a and P9b lets the previously wound-up amount of the approach zone pass in the opposite direction, and the microcomputer immediately goes to step S141 after CNT1R=2 is confirmed at step S131.

At step S141 in FIG. 4C the microcomputer clears the content of variable CNT1R to 0. Then the microcomputer MCU clears the value of timer TMR to 0 and starts counting time by this timer TMR (step S142). Then the microcomputer waits by OR logic until the value of variable CNT1R reaches 1 (step S143) or until the timer TMR reaches the value corresponding to 2000 ms (step S144). If the value of variable CNT1R first becomes 1, the microcomputer will proceed to step S145. If TMR=2000 ms is first achieved, the microprocessor will go to step S161 of FIG. 4D.

The determination at step S144 is also a wait for time-out, similar to that described above, which is provision against occurrence of some anomaly in this situation. In the normal operation the state C of FIG. 7C is achieved, so that the opening start edge of next perforation P9a comes to above the photoreflector 10 (PR1), whereupon the output of photoreflector 10 (PR1) starts rising as shown at point g in FIG. 6. Then the value of variable CNT1R becomes 1, and the value of timer TMR at that time is stored in another variable T1 (step S145). This corresponds to storing the passage start timing of perforation P9 a for a moment.

Next, the microcomputer MCU waits by OR logic until the value of variable CNT1R becomes 2 (step S146) or until the timer TMR reaches the value corresponding to 2000 ms (step S147). If the value of variable CNT1R first becomes 2 then the microprocessor will go to step S148. If TMR=2000 ms is first achieved then the microprocessor will go to step S161 of FIG. 4D. In the normal operation, the state D of FIG. 7D is achieved and the opening start edge of next perforation P8b comes to above the photoreflector 10 (PR1), whereupon the output of photoreflector 10 (PR1) again starts rising as shown at point h in FIG. 6. Then the value of variable CNT1R becomes 2 and the value of timer TMR at that point is stored in another variable T2 (step S148). This corresponds to storing the passage start timing of perforation P8b for a moment.

Here, the microcomputer MCU performs calculation of Equation (1) below and stores the result thereof in variable TBR (step S149).

In this calculation, TBR is a signal change time per bit of magnetic recording (a recording time per unit bit), which is the bit rate. Further, Kr is a coefficient for correlating the bit rate with the time difference between the passage start timings of two perforations, i.e., the time necessary for passage in the linear function. An actual value of the coefficient may be set to be an optimum coefficient for this camera from the relationship among the three factors: the length between the opening start edges of the two perforations; the permissible length of magnetic track; and the number of magnetic recording bits.

Next, the microcomputer MCU counts one down the variable FCNT indicating the film counter (step S150), and then checks whether the value of variable FCNT is 0 (step S151). Since the status at this point is in the first situation after photography of the eighth frame F8, the value of variable FCNT is not 0, so that the microcomputer proceeds to step S152 to start recording frame data onto the magnetic track D.

The frame data is photographic information for each frame F and differs for each frame F. The data of each frame F is stored in a recording area (not illustrated) for each frame F indicated by variable FCNT representing the film counter. This operation of recording the data onto the magnetic track D is an operation of repetitively inverting the electric current supplied to the magnetic recording head coil H1 incorporated in the magnetic head 11 in the forward direction and in the backward direction, and a time of one cycle for its rise corresponds to the aforementioned bit rate TBR. Then recording of digital data is carried out in the method for changing phases of rise waveform by 1/0 of bit of recording data. After this operation is repeated for the predetermined number of bits, this recording of frame data onto the magnetic track D is completed. In FIG. 6 recording of frame data for frame F8 onto the magnetic track D8 is carried out between point i and point j. The recording frequency f at this time is f=1/TBR.

On the other hand, the microcomputer MCU returns to step S141 to clear the variable CNT1R to 0 at the same time as the recording start of frame data onto the magnetic track D8 (step S152). By this, when the opening start edge of next perforation P8a reaches the position of photoreflector 10 (PR1) (the state E of FIG. 7E), the variable CNT1R becomes 1 (step S143) and the value of timer TMR at that point is stored as passage start timing of perforation P8a in the variable T1 for a moment. When variable CNT1R becomes 2 (step S146), the value of timer TMR at that point is stored as passage start timing of perforation P7b in the variable T2 for a moment, and the bit rate TBR for recording frame data for frame F7 onto the magnetic track D7 is determined according to Equation (1) described above (step S149).

After that, the operation of steps S141 to S152 is repeated in the same manner before variable FCNT indicating the film counter becomes 0. When the photoreflector 10 (PR1) finally catches the opening start edge of perforation P0b of the film reader section at the position in the state F of FIG. 7B (point q in FIG. 6), the value of variable FCNT becomes 0 at step S151 and then the microprocessor goes to step S153 to perform recording of reader data onto the magnetic track RD.

The reader data has common information to one roll of that film and the magnetic track for it is provided on an extension line of the magnetic tracks D of frame data and on the reader portion (the portion without any photographic frame), as indicated by RD surrounded by the dashed line in the state F of FIG. 7F. After recording of the reader data onto the magnetic track RD is carried out at step S153, two or more edges of perforation P will never come in the next loop, and thus determination of time up results at the time-out wait of step S144 or S147. Then the microcomputer jumps to step S161 of FIG. 4D to stop the motor 18 (M2), thereby completing this film rewinding routine (point t in FIG. 6).

Operation Upon Rewinding of Film From the Final End

With this camera the operation upon rewinding of film 1 from the end thereof will be described referring to the flowcharts of FIGS. 4A to 4D and FIGS. 5A and 5B, the timing chart of FIG. 8, and the schematic drawings of feed states of FIGS. 9A to 9F. The schematic drawings of feed states of FIGS. 9A to 9F schematically show the relative positional relation among the portions of film 1, the photoreflector 10 (PR1), and the magnetic head 11 at respective times.

In this embodiment, the final frame is supposed to be the fortieth frame F40 and the operation upon rewinding of film 1 from the state of photography carried out up for the final frame F40 (the state G shown in FIG. 9A) will be described. This state is the same as the positional relation wherein the eighth frame F8 used as an example in FIGS. 7A to 7F is replaced by the fortieth frame F40, but there exists no next frame when the film 1 is moved in the winding direction.

When instructed to start the film rewinding process from this state, the microcomputer MCU first clears variable CNT1F to 0 (step S101 shown in FIG. 4A), then starts drive of motor 16 (M1) (step S102), and, at the same time, resets the value of timer TMR to 0 and starts count of time (step S103). This point in time corresponds to point "a" in the timing chart shown in FIG. 8. Drive of motor 16 (M1) causes the film 1 to start moving in the winding direction from the position in the state G of FIG. 9A.

The microcomputer MCU waits by OR logic either until the value of variable CNT1F becomes 2 (step S104) or until the timer TMR reaches the value corresponding to 300 ms, (step S105). In this case, since there exists no next frame to the frame F40 when the film 1 is moved in the winding direction, time-out of 300 ms occurs at step S105 (point u in FIG. 8), the microprocessor proceeds to step S106 to effect shortcircuit brake of 50 ms up to step S109, and then stops the motor 16 (M1) (point v in FIG. 8). The state of film 1 at this time is the state H of FIG. 9B, wherein the film 1 is stopped after wound up by a certain length further from the final frame. The operation up to this point secures the "approach zone", which is the same as described above, by drive for the predetermined time.

Subsequently, the microcomputer MCU starts rewinding of film 1 by the processes of steps S111 to S114. In this case, in response to YES against "Has the end of film come ?" at step S115, the microcomputer MCU goes to the process operation of step S121 and subsequent steps after it.

In this process operation, the microcomputer MCU waits by OR logic either until the value of variable CNT1R becomes 1 (step S121) or until the timer TMR reaches the value corresponding to 2000 ms (step S122). If the value of variable CNT1R first becomes 1, the microprocessor will go to step S123. If TMR=2000 ms is first achieved, the microprocessor will go to step S161 of FIG. 4D. In the normal operation, the film is delivered in the rewinding direction from the state H of FIG. 9B, and a first rise edge appears when the opening start edge of perforation P40b passes the position of photoreflector 10 (PR1) at arrival at the state 1 of FIG. 9C (point w in FIG. 8). This changes the value of CNT1R to 1 (step S121) and the value of timer TMR at that point is stored in the variable T1 (step S123). This corresponds to storing the passage start timing of perforation P40b for a moment.

Further, the microcomputer MCU waits by OR logic either until the value of variable CNT1F becomes 1 (step S124) or until the timer TMR reaches the value corresponding to 2000 ms (step S125). If the value of variable CNT1F first becomes 1, the microcomputer will go to step S126. If TMR=2000 ms is first achieved, the microprocessor will go to step S161 of FIG. 4D. In the normal operation, the state J of FIG. 9D results, wherein the opening end edge of the same perforation P40b comes to above the photoreflector 10 (PR1), whereupon the output of photoreflector 10 (PR1) falls as shown at point x in FIG. 8. This changes the value of CNT1F to 1 (step S124) and the value of timer TMR at that time is stored in the variable T2 (step S126). This corresponds to storing the passage end timing of perforation P40b for a moment.

Here, the microcomputer MCU performs calculation of Equation (2) below and stores the result thereof in the variable TBR (step S127).

$$TBR = Ke * (T2 - T1) \qquad (2)$$

In this calculation, TBR stands for a signal change time per bit of magnetic recording (a recording time per unit bit), which is the bit rate. Further, Ke is a coefficient for correlating the bit rate with the time difference between the passage start timing and passage end timing of one perforation, i.e., the time necessary for passage in the linear function. An actual value of the coefficient may be set to a coefficient optimum to this camera from the relation among the three factors: the size of the aperture width of this perforation; the permissible length of magnetic track; and the number of magnetic recording bits.

Here, a method for determining the coefficient Ke may be selected from the following two conceivable determination methods in connection with the way to determine the coefficient Kr in obtaining the bit rate TBR by Equation (1) described above.

The first method is a method for setting such Ke as to calculate the same bit rate when the moving speed of film is the same as that of non-final frame. This results in different space lengths for taking the time difference between the two cases, but a necessary operation is just to correlate Kr with Ke in accordance with a ratio of the space lengths.

The second method is a method for setting Ke as such a value that TBR calculated by Equation (2) is smaller than TBR calculated by Equation (1), even in the case of the moving speed of film being the same as that of non-final frame.

The reason the second method is employed will now be described. First, for the final frame F40, the bit rate TBR is determined at the passage end timing of perforation P40b and the magnetic recording is started based thereon. For the non-final frames, for example, for the frame F8, the bit rate TBR is determined at the passage start timing of perforation P8b and the magnetic recording is started based thereon. In this case, the magnetic recording start timing of the final frame F40 becomes later than the magnetic recording start timing of the non-final frame F8, so that the magnetically recordable length of the final frame on the film becomes shorter. Therefore, by setting the bit rate TBR onto the magnetic track D40 corresponding to the final frame F40 smaller by that degree, the actual recording data can be stored within the limited range of magnetic track for all frames F1 to F40.

Second, the space length of the gap between the perforation edges measured for determining the bit rate TBR onto the magnetic track D40 corresponding to the final frame F40 (the space length of the gap between the opening start edge and the opening end edge of P40b) is considerably shorter than the space length of the gap between the perforation edges measured for determining the bit rate TBR onto the magnetic track D corresponding to a non-final frame, for example, onto the magnetic track D8 corresponding to the frame F8 (the space length of the gap between the opening start edge of P9a and the opening start edge of P8b). This will result in degrading the measurement accuracy in measuring the time difference of passage of perforation edge for determining the bit rate TBR in the case of the final frame F40, as compared with the non-final frame F8. Therefore, by setting the bit rate TBR a little smaller for the final frame F40, it becomes possible to prevent the actual magnetic recording length from exceeding the permissible length even with maximum dispersion.

After completion of calculation of the bit rate TBR at step S127, the microcomputer MCU then records the frame data onto the magnetic track D40 (between point y and point z in FIG. 8). This recording of frame data onto the magnetic track D40 may be the same process as step S152 described above. The recording frequency f at this time is determined as f=1/TBR. Then the microcomputer MCU jumps to step S141 to continue the same processes as in the loop for each frame F in the case of midway rewinding, after the state K of FIG. 9E.

As described above, the present embodiment is constructed in such an arrangement that the bit rate of magnetic recording is calculated by measuring the passage time of the aperture width of one perforation only for the first magnetically recorded frame in the case of rewinding from the end of the film. While the bit rate of magnetic recording is calculated by measuring the necessary time for passage between the opening start edges of two perforations for the subsequent frames thereafter and for the all frames in the case of midway rewinding. This permits recording of photographic information onto the magnetic track corresponding to each frame to be effected for the all frames.

Since this embodiment is arranged to calculate the bit rate of magnetic recording by measuring the necessary time for passage between the opening start edges of two perforations (between the same-phase edges) for the other frames than the final frame. This method is less affected by dispersion upon shaping of waveform of an electric signal generated by an edge in the photoreflector 10 (PR1), thus enabling to obtain the stable bit rate.

SECOND PREFERRED EMBODIMENT

Next, the second embodiment of the present invention will be described. The hardware structure of the second embodiment is the same as that of the first preferred embodiment (FIGS. 1 to 3 are common to the two embodiments), and the second embodiment is different only in the process operation carried out by the microcomputer MCU from the first preferred embodiment. The basic flow of the process operation carried out by the microcomputer MCU is the same as in the first preferred embodiment and the flowchart (FIGS. 10A to 10D) is similar to the flowchart shown in FIGS. 4A to 4D. Therefore, only different points will be described herein.

When the microcomputer MCU determines at step S215 in FIG. 10C that the end of film has not come, it waits before variable CNT1F=2 (step S231). The first preferred embodiment was arranged so that at step S131 the microcomputer waited before variable CNT1R=2. Further, the microcomputer MCU waits before the variable CNT1F=1 at step S243, and it waits before the variable CNT1F=2 at step S246. The first preferred embodiment was arranged so that the microcomputer waited before CNT1R=1 at step S143 and waited before CNT1R=2 at step S146.

Namely, the first preferred embodiment employed the time difference between passage start timings of two perforations as the passage time difference between the perforation edges, which was the basis of calculation of the bit rate for the non-final frames, whereas the second preferred embodiment employs a time difference between passage end timings of two perforations. The second embodiment uses Equation (3) below as a calculation equation of bit rate TBR at step S249. In this case, the start timing of magnetic recording is an aperture end edge of perforation Pb (whereas it was the opening start edge in the first preferred embodiment).

$$TBR = Kf^*(T2-T1) \quad (3)$$

A difference of Equation (3) from Equation (1) is Kf and an actual value of Kf may be set as a coefficient optimum to this camera from the relation among the three factors: the length between the opening end edges of two perforations; the permissible length of magnetic track; and the number of magnetic recording bits. There are the following two methods as to the connection with the coefficient Ke set by the same process as in the first preferred embodiment.

The first method is a method for setting such Kf to calculate exactly the same bit rate in the case of the moving speed of film being the same as that of the final frame. This results in different space lengths for taking the time difference between the two cases, but the necessary operation is just to correlate Ke with Kf in accordance with a ratio of the space lengths. This is a reasonable method, because in the case of the second preferred embodiment the starting point of magnetic recording on the film is fixed for the final frame and for the non-final frames.

The second method is a method for setting Kf as such a value that TBR calculated by Equation (2) becomes smaller than TBR calculated by Equation (3), even in the case of the moving speed of film being the same as that of the final frame. The reason this method is employed will be further described. The space length of the gap between perforation edges measured for determining the bit rate TBR onto the magnetic track D40 corresponding to the final frame F40 (the space length of the gap between the opening start edge and the opening end edge of P40b) is considerably shorter than the space length of the gap between perforation edges measured for determining the bit rate TBR onto the magnetic track D corresponding to a non-final frame, for example, onto the magnetic track D8 corresponding to the frame F8 (the space length of the gap between the opening end edge of P9a and the opening end edge of P8b). This results in degrading the measurement accuracy for measuring the difference between passing times of the perforation edges for determining the bit rate TBR in the case of the final frame F40, as compared with the case of the non-final frame F8. Therefore, by setting the bit rate TBR a little smaller for the final frame F40, it becomes possible to prevent the actual magnetic recording length from exceeding the permissible range even with maximum dispersion.

As described above, the present embodiment is arranged to calculate the bit rate of magnetic recording by measuring the passing time of the opening width of one perforation only for the first magnetically recorded frame in the case of rewinding from the final end of film and to calculate the bit rate of magnetic recording by measuring the necessary time for passage between opening end edges of two perforations for the frames after that and for the all frames in the case of midway rewinding. This makes it possible to record the photographic information onto the magnetic track corresponding to each of the all frames.

Since this embodiment is arranged to calculate the bit rate of magnetic recording by measuring the necessary time for passage between opening end edges of two perforations (between same-phase edges) for the other frames than the final frame, it is less affected by dispersion in shaping the waveform of an electric signal generated by an edge in the photoreflector 10 (PR1), thus enabling to obtain the stable bit rate. Further, this embodiment, differs from the case of the first preferred embodiment, has an advantage that the starting positions of magnetic recording can be unified for the all frames.

As apparent from the above description, according to the present invention, the recording time per unit bit (the bit rate) of photographic information onto the magnetic track corresponding to one frame is determined from the time difference between passage start timing and passage end timing of the second perforation attendant on the one frame, whereby for the all frames it becomes possible to record the photographic information onto the magnetic tracks corresponding to the respective frames.

The recording time per unit bit (the first bit rate) of photographic information onto the magnetic track corresponding to the final frame is determined from the time difference (the first measured time difference) between the passage start timing and passage end timing of the second perforation attendant on the final frame. While the recording time per unit bit (the second bit rate) of photographic information onto the magnetic track corresponding to a recording target frame is determined from the time difference (the second measured time difference) between the passage start timing of the first perforation attendant on a frame located one frame next to the recording target frame in the rewinding direction and the passage start timing of the second perforation attendant on the recording target frame for the other frames than the final frame, whereby for the all frames it becomes possible to record the photographic information onto the magnetic tracks corresponding to. the respective frames. In this case, the recording time per unit bit onto the magnetic track corresponding to the recording target frame is determined at the passage start timing of the second perforation of the recording target frame (non-final frame) and the magnetic recording is started based thereon, which makes it possible to perform the magnetic recording fully using the recordable region of magnetic track for each recording target frame.

In the above configuration, since the first bit rate is determined by multiplying the first measured time difference by the first coefficient and the second bit rate is determined by multiplying the second measured time difference by the second coefficient, the first recording time and second recording time each can be optimized thereby.

In the above configuration, since the first coefficient and second coefficient are arranged to be set as such values that the first bit rate becomes smaller than the second bit rate, the recording time per unit bit of photographic information onto the magnetic track corresponding to the final frame becomes shorter than the recording time per unit bit of photographic information onto the magnetic tracks corresponding to the non-final frames, whereby the actual recording data can be stored within the limited range of magnetic track for the all frames.

The recording time per unit bit (the first bit rate) of the photographic information onto the magnetic track corresponding to the final frame is determined from the time difference (the first measured time difference) between the passage start timing and passage end timing of the second perforation attendant on the final frame. While the recording time per unit bit (the second bit rate) of the photographic information onto the magnetic track corresponding to the recording target frame is determined from the time difference (the second measured time difference) between the passage end timing of the first perforation attendant on a frame located one frame next to the recording target frame in the rewinding direction and the passage end timing of the second perforation attendant on the recording target frame for the other frames than the final frame, whereby for the all frames it becomes possible to record the photographic information onto the magnetic tracks corresponding to the respective frames. In this case, the first bit rate is determined at the passage end timing of the second perforation of the final frame and the magnetic recording is started based thereon, and the second bit rate is determined at the passage end timing of the second perforation of the recording target frame (nonfinal frame) and the magnetic recording is started based thereon. Therefore, the bit rate is determined at the passage end timing of the second perforation for the final frame and for the non-final frames and the magnetic recording is started based thereon, whereby the start positions of magnetic recording can be unified for the all frames.

In the above configuration, the first bit rate is determined by multiplying the first measured time difference by the first coefficient and the second bit rate is determined by multiplying the second measured time difference by the second coefficient, whereby the first bit rate and second bit rate each can be optimized thereby.

In the above configuration, since the first coefficient and second coefficient are set as such values as to equalize the first bit rate to the second bit rate, the recording time per unit bit of photographic information onto the magnetic track corresponding to the final frame is equal to the recording time per unit bit of photographic information onto the magnetic track corresponding to the non-final frame, whereby the actual recording data can be stored within the limited region of magnetic track for the all frames.

In the above configuration, since the first coefficient and second coefficient are set as such values that the first bit rate becomes smaller than the second bit rate, the recording time per unit bit of photographic information onto the magnetic track corresponding to the final frame becomes shorter than the recording time per unit bit of photographic information onto the magnetic track corresponding to the non-final frame, whereby the actual magnetic recording length in the final frame is prevented from exceeding the permissible length of magnetic track.

What is claimed is:

1. A camera comprising:

a magnetic recorder to record photographic information onto a magnetic track of a film corresponding to each frame of said film while rewinding the film photographed up to a final frame;

a sensor to detect passage of a first perforation and a second perforation provided as attendant on each frame of said film and disposed at ends in a winding direction thereof;

a first recording time determining circuit to determine, based on a first time difference between a passage start time and a passage end time detected by said sensor of a second perforation attendant on said final frame upon rewinding of said film, a first recording time per unit bit in order to record photographic information onto a magnetic track corresponding to said final frame; and a second recording time determining circuit to determine, based on a second time difference between a passage start time of a first perforation attendant on a frame located one frame next to a recording target frame in the rewinding direction and passage start time of a second perforation attendant on said recording target frame upon rewinding said film, said passage start time and said passage time being detected by said sensor, a second recording time per unit bit for recording photographic information onto a magnetic track corresponding to said recording target frame.

2. The camera according to claim 1, wherein said first recording time determining circuit determines said first recording time by multiplying said first time difference by a first coefficient, and wherein said second recording time determining circuit determines said second recording time by multiplying said second time difference by a second coefficient.

3. The camera according to claim 2, wherein said first coefficient and said second coefficient are set so that said first recording time is shorter than said second recording time.

4. A camera comprising:
- a magnetic recorder to record photographic information onto a magnetic track of a film corresponding to each frame of said film while rewinding the film photographed up to a final frame;
- a sensor to detect passage of a first perforation and a second perforation provided as attendant on each frame of said film and disposed at ends and in a winding direction thereof;
- a first recording time determining circuit to determine, based on a first time difference between a passage start time and a passage end time detected by said sensor of a second perforation attendant on said final frame upon rewinding of said film, a first recording time per unit bit in order to record photographic information onto a magnetic track corresponding to said final frame; and
- a second recording time determining circuit to determine, based on a second time difference between a passage end time of a first perforation attendant on a frame located one frame next to a recording target frame in the rewinding direction and passage end time of a second perforation attendant on said recording target frame upon rewinding said film, said passage start time and said passage time being detected by said sensor, a second recording time per unit bit for recording photographic information onto a magnetic track corresponding to said recording target frame.

5. The camera according to claim 4,
- wherein said first recording time determining circuit determines said first recording time by multiplying said first time difference by a first coefficient, and
- wherein said second recording time determining circuit determines said second recording time by multiplying said second time difference by a second coefficient.

6. The camera according to claim 5, wherein said first coefficient and said second coefficient are set so that said first recording time and said second recording time become substantially equal to each other.

7. The camera according to claim 5 wherein said first coefficient and said second coefficient are set so that said first recording time is shorter than said second recording time.

* * * * *